United States Patent
Vinton et al.

(10) Patent No.: US 6,276,194 B1
(45) Date of Patent: Aug. 21, 2001

(54) APPARATUS AND METHOD FOR TESTING THE EFFECTIVENESS OF DYNAMIC SEALS IN A DUST-LADEN OPERATING ENVIRONMENT

(75) Inventors: Mark David Vinton, Tipton; David Michael Toth, Brighton; Bhawani Sanker Tripathy, Canton, all of MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/323,584

(22) Filed: Jun. 1, 1999

(51) Int. Cl.$^7$ ................................................. G01M 3/04
(52) U.S. Cl. ................................................. 73/40.7; 73/40
(58) Field of Search ............................. 73/40.7, 40, 46, 73/118.1; 277/320

(56) References Cited

U.S. PATENT DOCUMENTS

| | | |
|---|---|---|
| 2,346,690 | 4/1944 | Larkins, Jr. . |
| 3,030,800 * | 4/1962 | Dega ..................................... 73/37.5 |
| 3,097,521 | 7/1963 | Dega . |
| 3,180,135 * | 4/1965 | Cain et al. ............................... 73/46 |
| 3,188,855 * | 6/1965 | Dega ........................................ 73/37 |
| 3,546,923 * | 12/1970 | Fletcher et al. .......................... 73/40 |
| 3,987,663 * | 10/1976 | Repella .................................... 73/46 |
| 4,051,717 * | 10/1977 | Miller ...................................... 73/46 |
| 5,381,701 | 1/1995 | Frankenthal . |
| 5,383,351 * | 1/1995 | Kotlyar .................................... 73/40 |

* cited by examiner

Primary Examiner—Hezron Williams
Assistant Examiner—C. D. Garber
(74) Attorney, Agent, or Firm—Reising, Ethington, Barnes, Kisselle, Learman & McCulloch, P.C.

(57) ABSTRACT

An apparatus and procedure is provided for testing and evaluating the sealing effectiveness of dynamic seals of the type having at least one and often at least two dust-excluding seals. Included is a housing having a support wall formed with an opening through which a representative shaft is supported for rotation. An annular gap exists between the shaft and wall opening and is closed by the test seal. A dust chamber is provided on the atmosphere side of the test seal and includes a slow speed dust redistribution device which gathers and transports dust from the bottom of the chamber to the top where it is released and falls back into the chamber. A high speed beater agitation device disperses the released dust to maintain a constant density dust cloud environment within the dust chamber. A dry dust collection chamber is provided on the opposite oil side of the test seal. A separate pumping seal with hydrodynamic features creates a draw of the dust-laden air from the dust chamber toward the dust collection chamber. Dust which passes by the test seal is collected and measured to assess the sealing effectiveness of the test seal.

25 Claims, 4 Drawing Sheets

APPARATUS AND METHOD FOR TESTING THE EFFECTIVENESS OF DYNAMIC SEALS IN A DUST-LADEN OPERATING ENVIRONMENT

BACKGROUND OF THE INVENTION

1. Technical Field

This invention relates to apparatus and method for testing the sealing effectiveness of dynamic seals, and particularly dust-exclusion seals operating in a dust-laden environment.

2. Related Prior Art

Dynamic seals are used in many engine and machine applications to seal between relatively movable parts. Dynamic oil seals are used to close the annular gap between the crankshaft of an engine and the opening in the block through which the crankshaft extends. Such seals include at least one oil lip to retain lubricant, such as oil or grease, on one side of the seal and include one or more dust lips of the radial or face type to exclude contaminants such as dust and dirt on the opposite atmospheric or air side of the seal.

Various test apparatus and procedures have been proposed and/or are in use in connection with dynamic oil seals to test their effectiveness for particular applications. U.S. Pat. No. 3,987,663, for example, discloses a non-destructive test apparatus for quickly testing the integrity of seals in a production setting. The seals are mounted on a fixture and pressurized with air on one side and monitored on the opposite side for air leakage which would indicate seal failure. The disclosure of the above patent is incorporated herein by reference. While such a test method and apparatus is beneficial for quickly testing seals in a production setting, it is desirable during the development and qualification of dynamic seals to test their effectiveness under conditions which simulate or exaggerate the actual operating conditions which they would likely be subjected to in service.

Many such oil seals are designed to operate industry environment and thus, in addition to the primary lubricant sealing lip, include one or more of the radial or face-type dust lips which operate to exclude dust from entering the seal and contaminating the oil lip. Oil lips are commonly made from low friction flouropolymer materials, such as PTFE. It is well known that such materials perform well only when properly protected. Dry dust-laden conditions quickly degrade PTFE oil lips leading to early seal failure. For this reason, dust lips are often fabricated of materials which tolerate operating in a dry, dusty environment more so than the oil lip.

The traditional approach to testing the effectiveness of such seals operating under dust-laden conditions has been to mount the seals in a housing about a rotating shaft. Oil is maintained on the oil side of the seal as it would be during normal use, and a dust chamber is provided on the opposite side of the seal to expose the dust lip to a dust-laden environment. Housed within the dust chamber is a single mixer blade mounted on an extension of the test shaft. The blade rotates at high speed with the shaft and collects and disburses the dust within the chamber. Over time, it has been observed that the high speed of the blade tends to pack the dust against the wall, forming a trench in the accumulation of dust at the bottom of the chamber in which the blade runs, providing less than the optimum amount of dust available for dispersion within the chamber by the blade. Difficulties are thus encountered in maintaining a uniform dust cloud environment within the chamber over the duration of the test. The seal is operated until oil is observed leaking past the dust lip. Such indicates a failure of the oil lip, likely accounted for by an earlier failure of the dust lip in excluding dust from contaminating the oil lip.

One drawback to such a test is that it does not provide much information about why a test seal may have failed. It would be beneficial to know, for example, when and how much dust passes by the dust lip over the course of the test period and to examine the seal at the conclusion of the test for evidence of dust patterns or accumulations which could aid in the evaluation of the seal and provide information helpful in altering the design of the seal, if necessary, to further improve performance. With current testing techniques, however, the presence of the oil on the oil side of the seal precludes the gathering of such information. Some of the dust which escapes past the dust lip passes through the oil lip and into the oil, making its collection highly impractical. Upon oil lip failure, the oil which leaks past the damaged oil lip wets the remaining dust present between the oil and dust lips, washing away at least some of the dust and disturbing the dust patterns and/or accumulations that may have been present that could be helpful in analyzing the performance of the dust lip.

It would thus be desirable to have a test apparatus and procedure for testing the performance of dynamic lip seals operating in a dust-laden environment which would enable collection and analysis of the dust which passes by the dust lip to provide more information about the performance of the dust lip operating under such conditions. Such is provided by the present invention.

SUMMARY OF THE INVENTION AND ADVANTAGES

Test apparatus for testing the sealing effectiveness of a dynamic dust-exclusion seal in a dust-laden environment of the type having at least one dust-excluding lip comprises a housing having a support wall with an opening therethrough and a test shaft supported for rotation within the opening with an annular gap therebetween to be closed by the seal to be tested. Seal mounting structure is provided for mounting the test seal with the dust-excluding lip of the seal supported in dynamic sealing relation with a corresponding sealing surface of the seal. A dust chamber is provided on one side of the wall for exposing an atmosphere side of the dust-excluding lip to a dust-laden operating environment. The apparatus is characterized by provision of a dry dust-collection chamber on an axially opposite side of the wall in communication with the dust chamber through the annular gap and operative for collecting any dust that may escape past the dust-exclusion lip through the gap.

The apparatus is operated according to a test procedure of the invention by rotating the shaft relative to the seal while maintaining a dust-laden environment within the dust chamber, and collecting any dust that may escape past the seal within the dry dust-collection chamber for ascertaining the effectiveness of the seal while operating in such an environment.

One advantage of the present invention is that it permits quantitative testing of dynamic seals having dust-excluding features operating in a dust-laden test environment. The dry dust-collection chamber on the protected side of the seal enables any dust that may pass by the dust-exclusion lip to be collected and measured during the course of a test cycle. The invention enables the performance of the dust lip to be monitored and evaluated quantitatively throughout the test cycle, independent of the performance of the primary oil lip. A further advantage of the dry dust-collection chamber is that any dust patterns or accumulations of dust that may build up during the course of a test are preserved, even after the ultimate failure of the dust-exclusion lip seal and can be examined to learn the possible cause of leakage and to assist in providing relevant information to continually improve the design and performance of seals. There is no oil present to wash the dust away.

Rather than rely on the leakage of oil past a failed oil lip to indicate a seal failure, the present invention enables seal manufacturers to establish specific quantitative performance criteria for ascertaining the effectiveness of a seal. For a given set of operating conditions, one or several seals may be tested for a given length of time and the leakage of dust monitored as to when and how much dust passes by the seal during the course of the test cycle. With such information available, the manufacturer or end user of dynamic seals can then established standardized quantitative performance criteria for such seals.

The invention also provides a test apparatus having a stationary support wall and a rotatable shaft extending through an opening in the wall to be sealed by a test seal having at least one dynamic dust-exclusion lip. A dust chamber is provided on one side of the wall for exposing an atmospheric side of the dust-exclusion lip to a dust-laden environment. The apparatus is characterized by provision of a low speed dust scoop apparatus in combination with a high speed dust agitation device within the chamber. The dust scoop device is operative to engage and transport dust that has collected at the bottom of the chamber and release it at the top where it falls through the chamber back toward the bottom. The dust agitation device engages the falling dust and distributes it throughout the chamber, developing and maintaining an essentially constant density dust cloud environment within the dust chamber.

The combination low speed dust scoop device and high speed dust agitation device cooperate to produce a high density dust cloud within the chamber while preventing the dust from caking against the chamber wall out of the path of the dust scoop device.

THE DRAWINGS

These and other features and advantages of the present invention will become more readily appreciated when considered in connection with the following detailed description and appended drawings, wherein.

DETAILED DESCRIPTION

Figure 1:
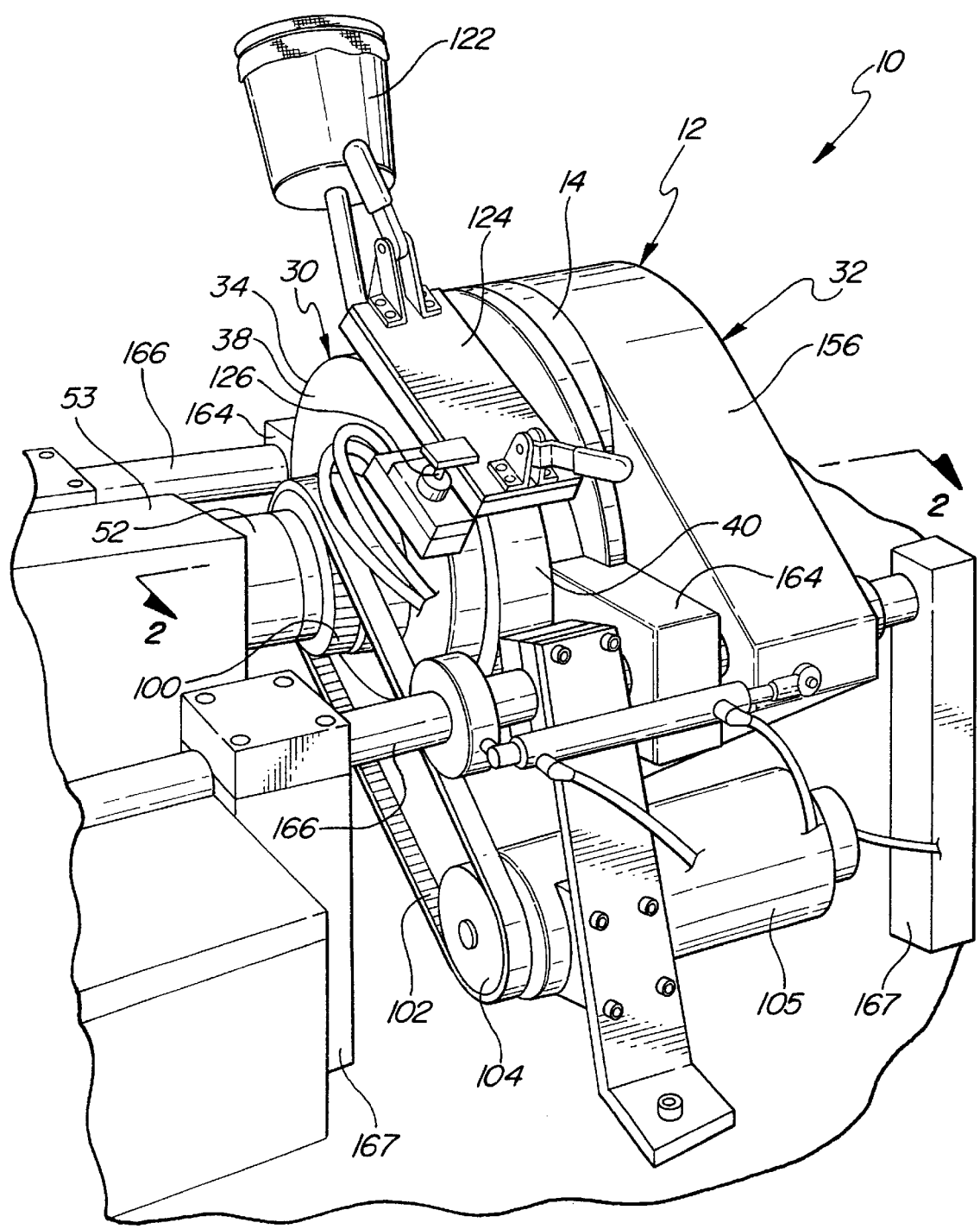
FIG. 1 is a fragmentary perspective view of a test apparatus constructed according to a presently preferred embodiment of the invention.
Figure 2:
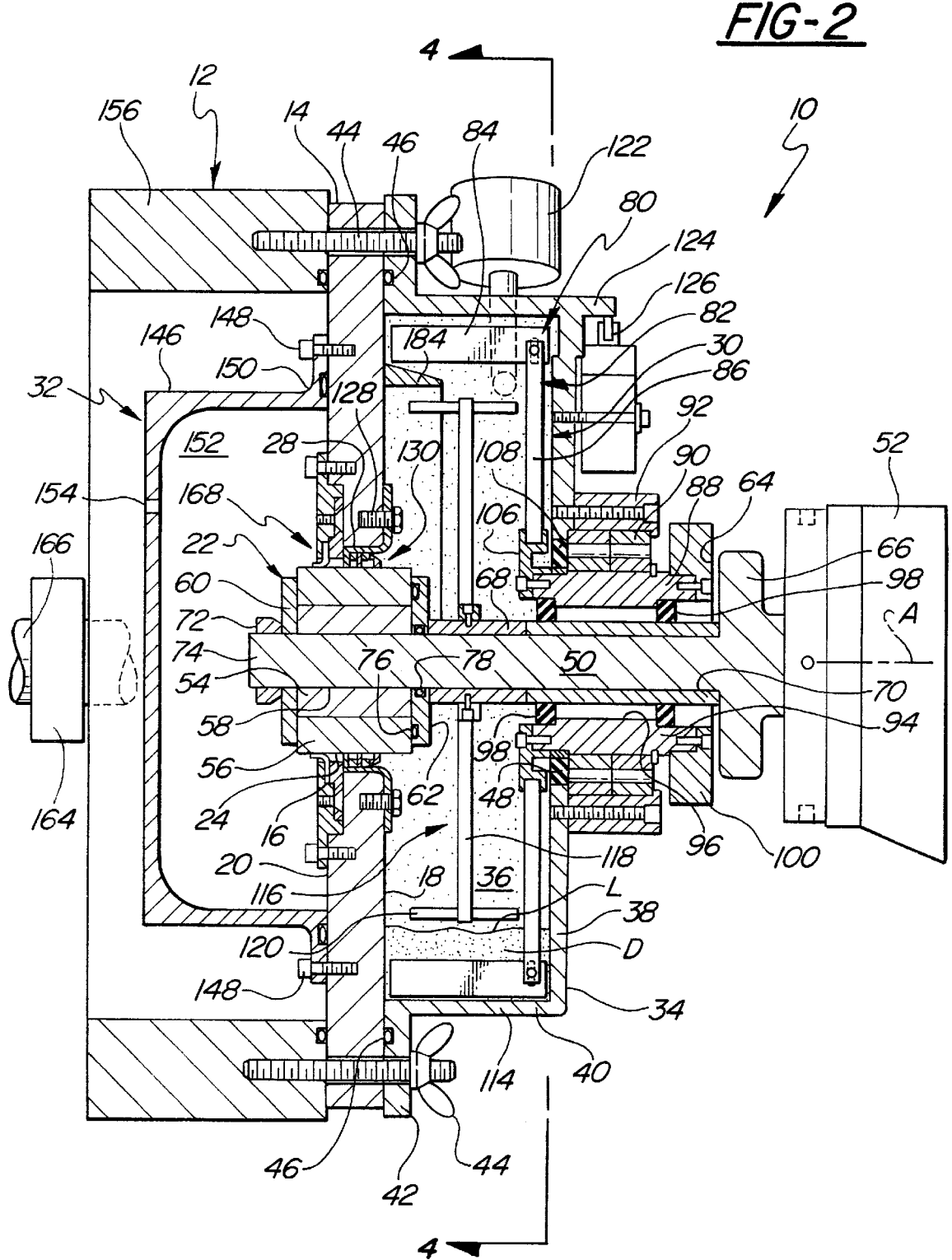
FIG. 2 is a fragmentary cross-sectional view taken generally along lines 2—2 of FIG. 1.

Test apparatus for testing the sealing effectiveness of dynamic test seals operating in a dust-laden environment is shown generally at 10 in FIGS. 1 and 2 and comprises a housing 12 having an inner stationary partition or support wall 14 formed with an opening 16 therethrough extending between axially opposite sides 18, 20 of the wall 14. The wall 14 preferably comprises a metallic plate having a generally ring-shaped configuration. The opening 16 in the plate 14 is preferably circular in cross-sectional shape and has a predetermined fixed diameter.

As shown best in FIG. 2, a shaft assembly 22 is supported for driven rotation within the opening 16 about a central rotation axis A of the shaft assembly 22. The shaft assembly 22 presents an outer peripheral surface 24 spaced from the wall of the opening 16 to define an annular gap 28 therebetween to be closed by the test seal and representative of that which would exist between the actual shaft and the opening in the housing of an engine, machine or other equipment from which the shaft extends. Further details of the shaft assembly 22 will be described below.

Still referring to FIG. 2, the housing 12 of the apparatus 10 has a dust chamber generally shown at 30 on one side 18 of the partition wall 14. A dry dust collection chamber, generally shown at 32, is provided on the axially opposite side 20 of the wall 14. The dust chamber 30 includes a chamber housing 34 secured in sealed, releasable engagement to the partition wall 14, defining an enclosed space 36 within the chamber housing 34 in which a quantity of dust D is contained. The chamber housing 34 includes a generally circular end wall 38 spaced axially from the partition wall 14 and an annular peripheral wall 40. The wall 40 is fixed at its axially outer end to the end wall 38 such as by welding, and is fixed such as by welding at its axially inner end to an annular mounting flange 42. The flange 42, in turn, is coupled such as by releasable fasteners 44 to the partition wall 14 and sealed in air-tight relation therewith by an intervening static face seal 46 or the like.

The end wall 38 of the chamber housing 34 has a central opening 48 aligned axially with the opening 16. The shaft assembly 22 extends through the opening 48 into the chamber housing 34, through the partition wall opening 16, and terminates within the adjacent dust collection chamber 32. The shaft assembly 22 preferably comprises a quill 50 coupled at its axially outer end to a rotary drive spindle 52 external to the housing 12 (see FIG. 1 also) and extending therefrom along the axis A through the dust chamber 30 and partition wall opening 16 to a free end within the dust collection chamber 32. The spindle 52 may comprise a conventional electric drive spindle fitted with a suitable fixturing such as a chuck for mounting the quill 50. As shown best in FIG. 1, the spindle 52 is powered by a rotary drive, such as an electric motor 53, for drivingly rotating the quill 50 about the axis A relative to the rotatably fixed housing 12 of the apparatus 10. The drive 53 is preferably variable, enabling the quill 50 to be rotated at variable speeds typically in the range of between 1,000 to 3,000 rpm, so as to rotate the shaft 22 at speeds representative of those which would be encountered by the test seal under actual operating conditions, or at greater or lesser speeds if desired.

Referring again to FIG. 2, the quill 50 preferably mounts an inner offset sleeve 54 and an outer test shaft sleeve 56 within the opening 16. The sleeves 54, 56 have eccentric mating surfaces 58 which enable the effective movement of the shaft assembly 22 to be altered if desired in order to simulate varying conditions of shaft eccentricity and/or shaft runout during the course of the test, which prescribed conditions are known per se to the art of testing seals and disclosed, for example, in the incorporated U.S. Pat. No. 3,987,663. The test apparatus 10 also fitted with suitable fixturing and controls to enable the housing 14 to oscillate axially relative to the shaft 22 to simulate axial load cycling of the test seal if desired.

The set of sleeves 54, 56 are restrained axially on the quill 50 by opposed end washers 60, 62. The washer 62 reacts against a shoulder 64 of a radially enlarged flange 66 of the quill 50 through intervening spacer sleeves 68, 70 disposed about the quill 50 and rotatable therewith. The end washer 60 is engaged by a nut 72 threaded onto the free end 74 of the quill 50. When tightened, the nut 72 urges the end washer 60 axially toward the end washer 62, squeezing the set of sleeves 68, 70 therebetween and fixing them axially on the quill 50 within the opening 16. The end washer 62 is supported within the dust chamber 30 and is fitted with a static face seal 76 adjacent its outer periphery in sealed engagement with the test shaft sleeve 56, and is likewise fitted on its inner diameter with a static ring seal 78 sealingly engaging the outer peripheral surface of the quill 50. The seals 76, 78 prevent dust in the chamber from entering the dust collection chamber 32 along the quill 50 or between the sleeve sets 54, 56, such that the only passage between the dust chamber 30 and dust collection chamber 32 is through the annular gap 28 between the shaft 22 and partition wall 14.

Figure 4:
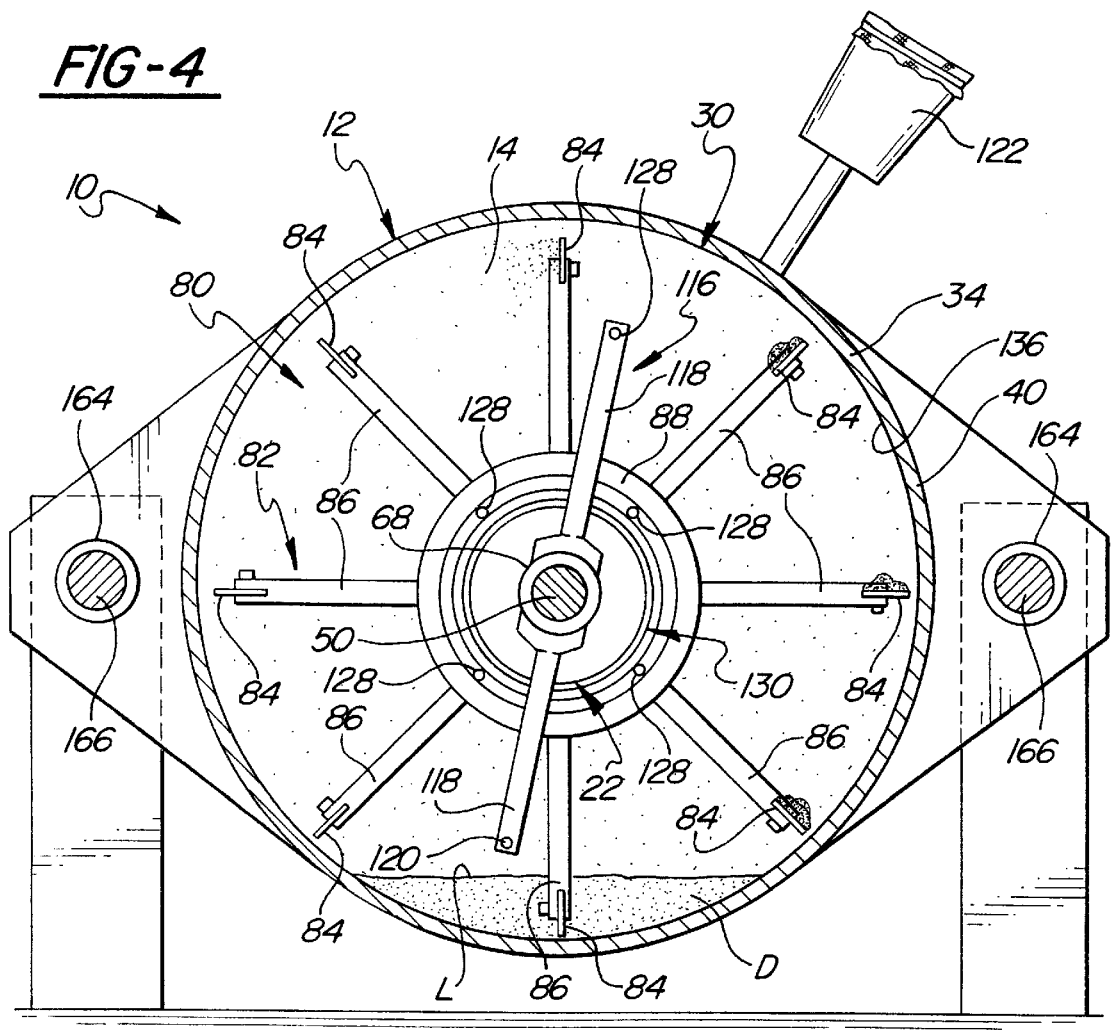
FIG. 4 is a cross-sectional view taken generally along lines 4—4 of FIG. 2.

According to a particular feature of the invention as best illustrated in FIGS. 2 and 4, the dust chamber 30 includes a dust agitation system 80 which is operative to generate a dust-laden environment within the dust chamber 30. The agitation system 80 includes a dust redistribution or scoop device 82 in the preferred form of a low speed scoop mechanism supported for driven rotation within the dust chamber 30 and operative to collect the dust D that settles to the bottom of the chamber 30 and transport it to the top of the chamber where it falls back toward the bottom through the chamber 30 by gravity. The device 82 preferably comprises a plurality of scoops or paddles 84 supported at the free ends of a corresponding plurality of arms 86 fixed to and extending radially outwardly from a central hub 88. As shown best in FIGS. 2 and 5, the hub 88 is journaled by bearings 90 in a fixed collar 92 of the housing 14 projecting axially outwardly of the end wall 38. The hub 88 has a cylindrical main body portion 94 journaled by the bearings 90 and having a central opening 96 therein accommodating the quill 50 and its spacer 70 in radially spaced relation thereto to permit relative rotational movement between the high speed shaft 22 and the much lower speed hub 88. Dynamic lip seals 98 are provided to close the opening 96 of the body 94 to perfect a dust-tight seal between the hub 88 and the shaft 22 to prevent dust from escaping from the chamber 30 through the opening 96.

A toothed pulley 100 is mounted on the body 94 of the hub 88 exteriorly of the housing 12 (FIG. 1) and is coupled by a toothed drive belt 102 to the toothed pulley 104 of a drive motor 105. Of course, alternative drive connections (e.g., direct gear drive, chain drive, etc.) are contemplated by the invention as alternative equivalents. The inward end of the hub body 94 mounts an end plate 106 on which the radial arms 86 and their associated paddles 84 are carried for rotation with the hub body 94 within the chamber 30.

Figure 5:
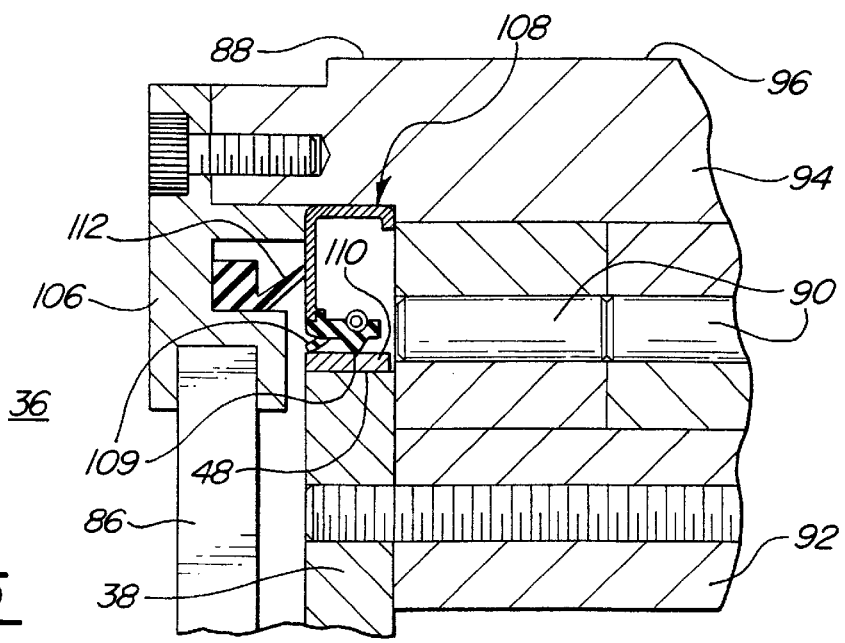
FIG. 5 is an enlarged fragmentary sectional view of a portion of FIG. 2.

As shown best in FIG. 5, a seal 108 is mounted on the hub body 94 within the opening 48 of the dust chamber end wall 38 and includes radial lips 109 sealingly engaging a stationary wear ring 110 of the end wall 38 for sealing the opening 48 against dust leakage past the hub 88. The end plate 106 mounts a face seal 112 engaging the face of the casing of the seal 108 for further sealing the chamber 30 against dust leakage.

As shown in FIGS. 2 and 4, the paddles 84 are carried at the ends of the arms 86 in closely adjacent relationship to the peripheral wall 40 of the chamber housing 34. The length of the paddles 84 is such that their axially opposite ends are supported in close proximity to the partition wall 14 and chamber end wall 38. The paddles 84 preferably comprises a planar, blade-like members having a rectangular shape and being slotted at their connected ends to permit radial extension of the paddles 84 on the arms 86 in order to adjust as needed the position the lower end 114 of each of the paddles 84 so that they come within close proximity to the bottom of the peripheral wall 40 of the low point of their revolution. The preferred spacing of the paddles 84 relative to the peripheral wall 40 is that which would enable the paddles 84 to rotate freely within the chamber without interference from the peripheral wall 40, yet sufficiently close (i.e., an ⅛ spacing or less) to enable the paddles 84 to scrape or sweep the dust D off the bottom of the partition wall 40 during operation and carry it upward on the paddles 84 toward the top of the chamber 30.

The motor 105 (FIG. 1) is operative to rotate the paddles 84 at a rate of about 20 rpm, but it is variable for increasing or decreasing the rate of rotation as desired (e.g., to within 1–50 rpm). The rotation of the paddles 84 is thus only a fraction of the speed of the shaft 22. Such slow rotation of the paddles 84 enables the dust D to be collected and transported by the paddles 84 from the bottom of the chamber 30 to the top whereupon the vertical orientation of the paddles permits the dust to drop back into the chamber 30 and fall again toward the bottom. The paddles 84 are operated at such slow speed as to prevent caking of the dust which, in a conventional dust test apparatus, occurs when a beater blade operating at 1,000 to 3,000 rpm encounters the dust and compacts it against the chamber wall out of the path of the blade, leaving a trench in which the blade runs that contains less than the full compliment of dust. The low speed paddles 84 of the present invention greatly minimize or eliminate such compaction and trenching of the dust D, as the paddles move slowly through the accumulated dust D.

The agitation system 80 of the present invention further includes a dust agitating device 116 supported within the dust chamber 30 radially inwardly of the dust redistribution device 82 and operative to engage and disburse the dust that falls from the paddles 84 near the top of the chamber 30 to create a dust cloud that is constant and generally uniform in density during the duration of the test cycle. The agitating device 116 includes a plurality of arms 118 fixed to the spacer sleeve 68 of the quill 50 and projecting radially outwardly thereof to free ends on which are carried beater elements 120. As shown in FIG. 1, the beater elements 120 are spaced radially inwardly of the paddles 84 and operate at a level above the accumulation level of the dust D at the bottom of the chamber 30. Since the sleeve 68 is fixed to the quill 50, the beater elements 120 rotate with the shaft at a rate far greater than that of the paddles 84. The typical shaft speed is on the order of 1,000–3,000 rpm, whereas the typical speeds of the paddles is on the order of about 20 rpm. The beater elements 120 may comprise cylindrical rods extending crosswise to the arms 18 in the axial direction of the housing 12. As the dust D is dropped from the paddles 84 at the top of the chamber 30, the dust encounters the beater elements 120 and arms 118 which disperses the dust to generate the dust cloud. The radially inward spacing of the beater elements 120 prevents the dust from being packed against the chamber wall and eventually trenched by the beater element. The problem is further minimized by locating the beater elements 120 above the level of the accumulated dust D so that they do not contact the accumulated pile of dust D, but only that which is dropped by the paddles 84.

The dust chamber 30 has a filtered air intake 122 and an inspection door 124 adjacent the top of the chamber 30. The door 124 is preferably hinged and secured in a closed position by a suitable lock mechanism, such as a quick release clamp. The door 124 cooperates at its swinging end with a switch 126 electrically coupled to the drive motor 53 of the quill and the drive motor 105 of the dust paddles 84. The switch 126 is operative when the door 124 is open to disable the motors to prevent rotation of the paddles 84 and beater elements 120, and operative when closed to close the circuit and enable operation of the motor.

The partition wall 14 includes seal mounting structure 128 for mounting a test seal 130 on the partition wall 14 in dynamic sealing relation to the shaft 22. The exact form of the mounting structure 128 is dependent to a large extend on the particular design of seal being tested, and can be modified accordingly, as will be appreciated and explained with reference to FIGS. 3A and 3B.

Figure 3A:
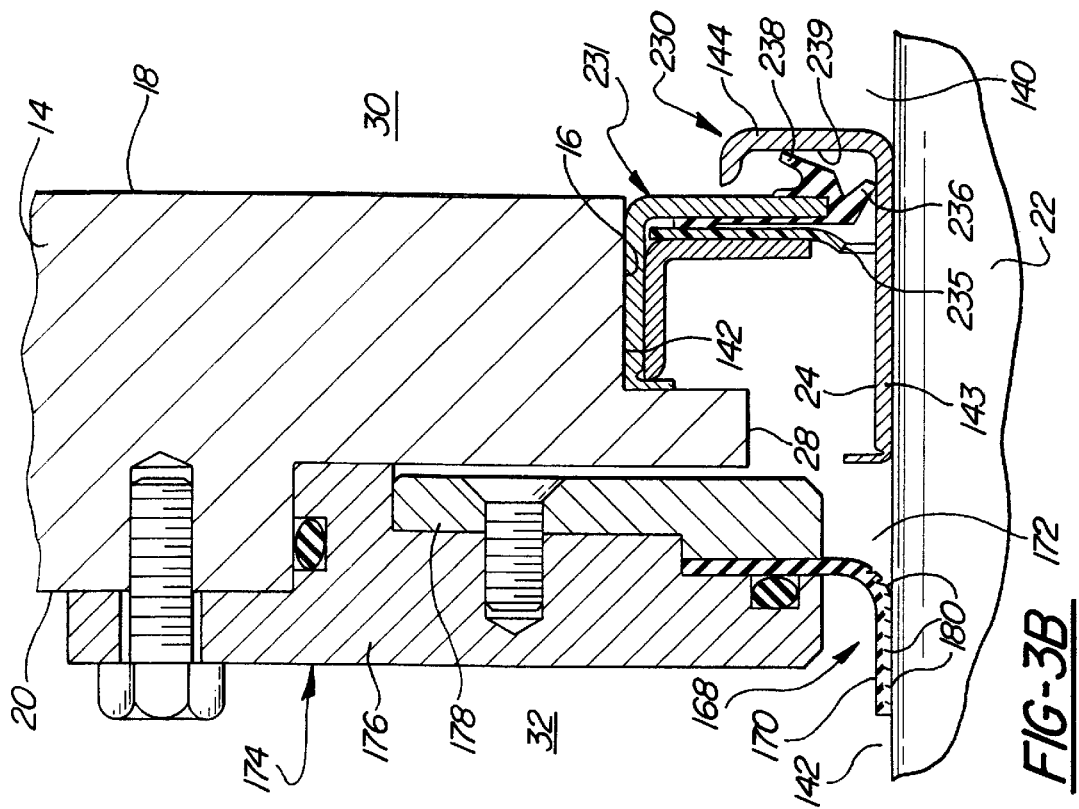
FIG. 3A is an an enlarged fragmentary sectional view of the test apparatus illustrating features of the sealed region and illustrating one type of test seal having both radial and face-type dust-exclusion lips.

In the illustrated example of FIG. 3A, a test seal 130 is shown face mounted to the partition wall 14 as it would be to a housing in actual use. The seal 130 includes an outer metallic carrier 131 fixed by fasteners 132 to the partition wall 14. A seal cartridge 133 is provided having an outer metal case 134 press-fit in the carrier 131 and mounting an oil retention lip 135 and a radial dust-exclusion lip 136 disposed in dynamic sealing engagement with the sealing surface 24 of the shaft assembly 22. It will be seen that the oil lip 135 has been trimmed so that it does not engage the shaft surface 24 and is rendered inoperative. A supplemental dust excluder sleeve 137 is pressed onto the shaft 22 and includes a face seal dust-exclusion lip 138 disposed in dynamic sealing engagement with an end sealing face 139 of the outer case 134 of the test seal cartridge 133.

The dust lips 136, 138 effectively bridge the space between the opening 16 in the wall 14 and the shaft 22, thereby closing the gap 28 and sealing the dust-laden environment of the dust chamber 30 on the atmosphere side 140 of the seal 130 from passing through to the primary oil lip 135 and to the oil side 141 of the seal 130. The function of the dust lips 136, 138 is thus to protect the primary oil lip 135 during actual use (i.e., untrimmed) from contamination from dust and other debris which would tend to prematurely wear or destroy the primary lip 135 and/or allow the passage of the dust through the primary lip 135 to the lubricated oil side 141 of the seal 130, possibly to the detriment of the lubricated working components (not shown) that would be protected by the seal 130 in an actual use setting.

Figure 3B:
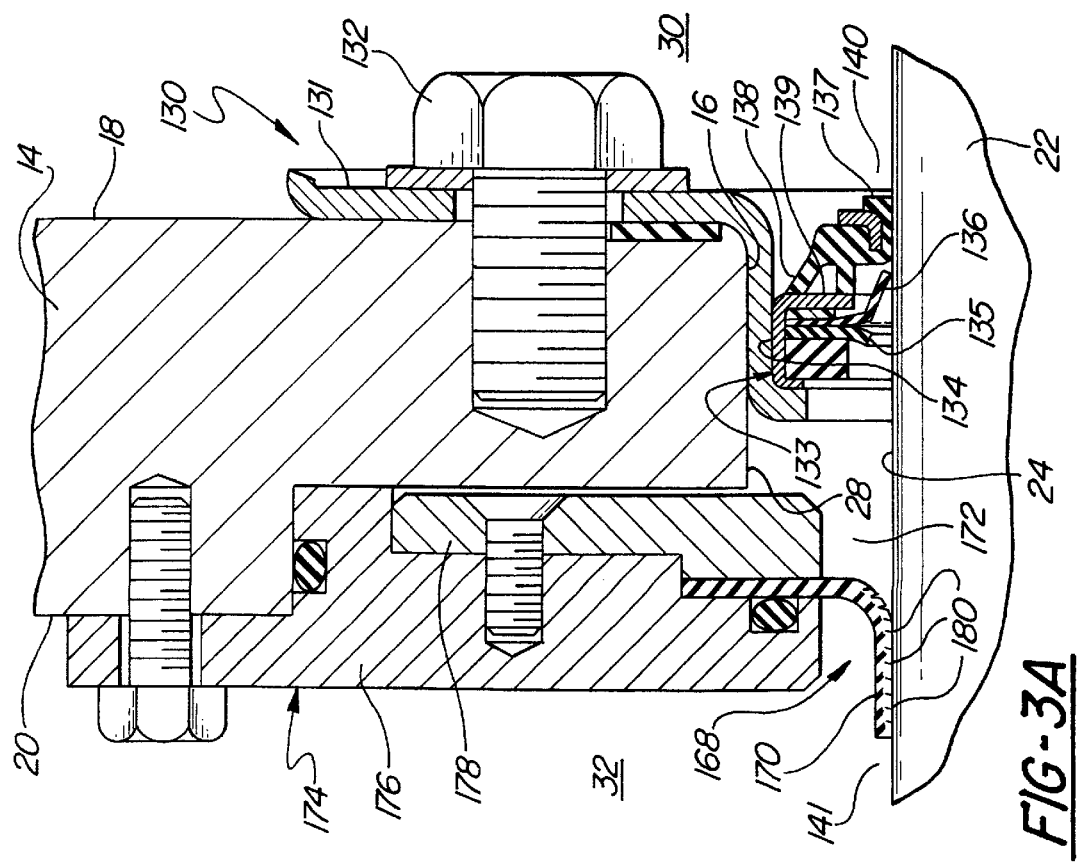
FIG. 3B is a view like FIG. 3A, but illustrating the testing of another type of seal of the unitized wear sleeve type again having both face and radial dust-exclusion lips.

FIG. 3B illustrates an alternative test seal 232 mounted for testing in the apparatus 10. The same reference numerals are used to designate like or corresponding features with the FIG. 3A test seal 130, but are offset by 100. The test seal 232 includes an outer metal carrier 231 having inner and outer case portions press fit into an annular recess 142 formed in the partition wall 14 (the modified wall being substituted for that of FIG. 3A) and mounting an oil lip 235 (likewise trimmed), radial dust-exclusion lip 236 and face seal dust-exclusion lip 238. The seal 230 includes an integrated wear sleeve 143 rotatable with the shaft 22 having an outer cylindrical surface providing the seal surface 24 engaging the radial dust-exclusion lip 236. An end flange 144 of the wear sleeve 143 extends radially outwardly of the shaft 22 presenting a radial seal face 239 engaging the face seal dust exclusion lip 238. It will be appreciated that the test seals 130, 230 of FIGS. 3A and 3B are but two examples of any of a number known and yet to be developed shaft or other dynamic seals having dynamic dust-excluding features. The apparatus 10 is equally adaptable to testing all such seals.

One notable distinction between the seals 130, 230 of FIGS. 3A and 3B is that the face seal dust-exclusion lip 138 of FIG. 3A is fixed on the shaft 22 and rotatable therewith relative to the stationary sealing face 139, whereas in FIG. 3B, the face lip 238 is stationary and engages the rotating sealing face 239.

The object of the apparatus 10 is to test the effectiveness of the dust-excluding lips of the seals 130, 230 when exposed to the dust-laden environment maintained within the dust chamber 30. The effectiveness can be measured by determining when and how much dust escapes past the lips 136, 138; 236, 238. For simplicity, reference to the test procedure will be made with respect to the seal 130 of FIG. 3A, it being understood that the same would apply to the FIG. 3B seal as well as other dynamic seals having dust-excluding seal features to be tested.

Unlike prior know test apparatus in which oil was maintained on the oil side 141 of the seal 130 as it would be in actual operation, the apparatus of the present invention provides instead the dry dust collection chamber 32 on what would be the oil side 141 of the seal 130. Any dust which passes by the dust lips 136, 138 is retained in the dust collection chamber 32 and remains dry throughout the test procedure.

The dust collection chamber 32 comprises a collection cover 146 releasably mounted on the side 20 of the partition wall 14 such as by fasteners 148 and sealed at the interface of the cover 146 and partition wall 14 by a static face seal 150. The cover 146 defines an enclosed dry air space 152 in communication with the annular gap 28 on the oil side 141 of the test seal 130 in which the dust is collected. The space 152 is vented to atmosphere via a small breather opening 154 in the cover 146.

As shown best in FIGS. 1 and 2, the housing 12 includes a separable mounting part 156 secured to the partition wall 14 by the fasteners 44 and mounting a set of fixed guide sleeves 164 slideable on guide rails 166 of a fixed support stand 167 to permit the part 156 of the housing 12, once detached from the partition wall 14, to be slid along the guide rails 166 axially away from the face plate 14 to provide access to the partition wall 14 for selective removal of the wall 14 in exchange for another, may be as required by the type of seal being tested as evident from FIGS. 3A and 3B.

According to another aspect of the invention and as best illustrated in FIG. 3A, a pressure differential generation device 168 is provided for producing a pressure drop across the test seal 130 in such manner as to cause the dust-laden air in the chamber 30 to be drawn toward the test seal 130 for movement toward the lower pressure dust collection chamber 32. Such helps maintain a concentration of dust at the dust lip 138 and further creates a constant draw through the gap 28 urging the flow of the dust-laden air toward and past the dust lips 138, 136. The positive draw through the gap 28 makes it possible to shorten the test period by exaggerating the concentration of dust to levels greater than that which would be encountered in normal operating conditions for the same time period.

As shown best in FIG. 3A (and 3B with respect to test seal 230), the preferred pressure differential device 168 is in the form of a hydrodynamic radial pumping seal element 170. The seal element 170 is separate and distinct from the test seal 130 and is supported by the housing 12 in dynamic sealing engagement with the shaft 22 in axially spaced relation to the test seal 130 on the oil side 141 of the test seal 130. The pumping seal 170 preferably comprises a lay down sleeve seal formed with hydrodynamic features 171 that cooperate with the rotating shaft 22 to produce a hydrodynamic action which pumps air from a sealed space 172 provided between the pumping seal 170 and the dust-exclusion seals 136, 138 into the enclosed space 152 of the collection cover 146, creating a low pressure atmosphere within the space 172 which urges the dust laden air from the dust chamber 30 into the space 172 thereby testing the integrity of the dust lips 136, 138. The space 172 thus effectively serves as a low pressure region of the dust collection chamber 32 and into which dust from the dust chamber 30 is initially received as it escapes past the dust lips 136, 138.

The pumping seal 170 is preferably mounted on a two piece carrier ring having plate portions 176, 178 which clamp an outer periphery of the pumping seal 170 and are in turn mounted as an assembled unit removably on the partition wall 14 with the pumping seal 170 in dynamic sealed relation about the test shaft 22. The hydrodynamic features of the pumping seal 170 are in the preferred form of a spiraling groove or grooves 180 formed on the running surface of the pumping seal 170 and formed by conventional techniques such as coining, molding, cutting, etc. The size and lead of the grooves 180 can be varied to achieve the desired pumping effect, with more aggressive grooves tending to increase the draw of the dust laden air, and less aggressive grooves 180 decreasing the draw.

The operation of the apparatus 10 will now be described in connection with a test procedure of the invention. With the dust collection chamber housing 156 slid on the guide rails 166 to an open position, the partition wall 14 with the appropriate seal mounting structure 128 is fitted with the test seal 130. The pumping seal 170 is mounted on the partition wall 14 in sealed relation about the test shaft 22 as described previously. The cover 146 of the dust collection chamber is secured to the partition wall 14 with fasteners 148 to close the chamber 32.

An appropriate amount of test dust D is introduced into the dust chamber 30 through the access door 124 to provide an accumulated level L at or above that of the paddles 84, but below that of the beater elements 120 when in their lowest position shown in FIG. 2, such that the beater elements 120 operate above and do not contact the accumulated pile of dust D contained in the bottom of the chamber 30. The door 124 is closed and latched thereby closing the switch 126. The motor 53 is activated to rotate the shaft assembly 22 and the beater elements 120 therewith. The action of the rotating shaft 22 against the pumping seal 170 generates negative pressure in the sealed space 172 and thus a draw of air from the dust chamber 30 toward the dust lips 138, 136 of the test seal 130. The shaft 22 and beater elements 120 are driven at a rate of about 1,000–3,000 rpm, representative of the shaft speed likely to be encountered by the test seal 130 in actual use. The motor 105 of the dust redistribution device 82 is activated to rotate the plurality of paddles 84 within the dust chamber 30 at a far lower speed than that of the beater elements 120 and preferably on the order of about 20 rpm, although more or less speed is contemplated by the invention provided it does not become so great as to cause the dust D in the chamber to be compacted against the walls of the chamber out of the path of the paddles 84. The low rpm paddles 84 scoop and carry dust D from the bottom of the chamber 30 upwardly where it is dumped off the paddles 84 near the top of the chamber as the paddles 84 approach a vertical orientation allowing the dust to fall through the chamber 30 back toward the bottom. As the dust D falls, it encounters the high speed beater elements 120 and arms 118 which agitate the dust and distribute it throughout the chamber to produce a high density, uniform dust cloud environment. Such a high and constant density dust environment is maintainable throughout the test period on account of the low rpm paddles 84 working in conjunction with the high rpm beater elements 120.

As shown in FIG. 2, the partition wall 14 is fitted with a dust hood 182 comprising an arcuate deflector mounted on the side 18 of the partition wall below the path of the paddles 84 and projecting axially outwardly of the test seal 130. The hood 182 serves to deflect the falling dust axially away from the test seal 130 to prevent the dust dropped from the paddles 84 at the top of the chamber from falling directly down onto the test seal 130.

The negative pressure within the sealed space 172 draws the dust-laden air of the chamber 30 toward the test seal 130. The effectiveness of the test seal 130 is determined by when and how much dust finds its way past the lips 138, 140 into the dust collection chamber 32. A fair portion of the dust that escapes past the test seal 130 is captured within the low pressure sealed space 172 (FIG. 3), whereas some of the dust may pass by the pumping seal 170 and be collected within the cover 146.

Periodically, operation of the apparatus 10 is halted and the cover 146 and pumping seal assembly 168 removed to inspect the dust collection chamber 32 for the presence of dust which would have escaped past the test seal 130. The pumping seal 170 may also be removed for inspection. As this is a dry test, the attendant is able to inspect also for the presence of any patterns of dust leakage or localized accumulations which may provide information as to the cause or mechanism of the seal leakage. Any dust that has leaked past the test seal 30 may be periodically collected from the dust chamber 32. The inspection process is repeated periodically throughout the test cycle until the cycle time is complete and/or until sufficient dust has been collected to indicate seal failure.

At the conclusion of the test, the dust collected from the chamber may be weighed to quantify the results and hence the performance of the seal. The dry nature of the test also enables the test seal 130 to be dismounted and inspected for unusual wear, damage, dust leakage patterns, and other evidence which may be helpful in determining why a seal may have leaked and how its design might be modified to improve performance.

The quantification of the test results further permits quantitative standards to be developed for particular seal applications. For example, in an engine shaft seal application, a standard may be established whereby no more than x amount of dust may be permitted to leak past the seal in a given amount of time. The test thus not only indicates whether a seal passes or fails as with the traditional wet seal test, but actually how well the seal performed in a quantitative sense.

Obviously, many modifications and variations of the present invention are possible in light of the above teachings. For example, the dust-excluding features can take the form other than or in addition to a sealing lip, such as a labyrinth, porous media, etc. It is, therefore, to be understood that within the scope of the appended claims, the invention may be practiced otherwise than as specifically described. The invention is defined by the claims.

What is claimed is:

1. Test apparatus for testing the sealing effectiveness of dynamic seals having at least one dynamic dust-exclusion seal operating in a dust-laden environment, said test apparatus comprising:

a housing including a support wall having axially opposite sides and an opening extending axially through said wall between said sides;

a shaft supported for rotation within and spaced radially from a wall of said opening defining an annular gap therebetween;

seal mounting structure associated with said support wall operative to mount a test shaft seal and support the at least one dust-excluding lip in dynamic sealing relation with an associated sealing surface for closing said annular gap;

a dust chamber provided on one side of said wall for exposing an atmospheric side of the test seal to a dust-laden operating environment;

a dust agitation system operative to generate and maintain a dust cloud environment within said dust chamber, and characterized by a dry dust collection chamber provided on the other side of said wall in communication with said dust chamber through said annular gap and operative to collect any dust that may pass by the test seal from said dust chamber.

2. The apparatus of claim 1 including a pressure differential generation device communicating between said chambers and operative to create and maintain a positive draw of dust laden air through said gap from said dust chamber to said dust collection chamber.

3. The apparatus of claim 2 wherein said pressure differential generation device comprises a radial lip pumping seal separate and distinct from the test seal and mounted on said support wall on said dust collection chamber side of said wall having at least one shaft-engaging sealing lip supported in sealing relation about said shaft.

4. The apparatus of claim 3 wherein said pumping seal includes hydrodynamic formations thereon operative to pump air from one side of the pumping seal adjacent the test seal to an opposite side communicating with said dust collection chamber.

5. The apparatus of claim 4 wherein said pumping seal defines a low pressure region on said one side between said pumping seal and an oil side of the test seal.

6. The apparatus of claim 1 wherein said dust chamber includes a dust redistribution device and a separate dust agitation device.

7. The apparatus of claim 6 wherein said dust chamber includes top and bottom regions and said dust redistribution device includes at least one rotatably driven dust scoop operative to collect dust that has settled at the bottom region of the dust chamber and to transport and release such dust at the top region of the chamber where it falls by gravity back toward the bottom region.

8. The apparatus of claim 7 wherein said dust redistribution device includes a plurality of said dust scoops.

9. The apparatus of claim 5 wherein said dust redistribution device and said dust agitation device are driven rotatably within said dust chamber.

10. The apparatus of claim 9 wherein said dust redistribution device is driven at a lower rpm than that of the dust agitation device.

11. The apparatus of claim 10 wherein said dust redistribution device is driven at about 1–50 rpm and said dust agitation device is driven at about 1500 to 3000 rpm.

12. The apparatus of claim 11 wherein said dust redistribution device is driven by a first motor and said dust agitation device is driven by a second motor.

13. The apparatus of claim 7 wherein said dust agitation device includes at least one rotatably driven beater element spaced radially inwardly of said at least one dust scoop and operative to engage and disperse the dust released from said scoop to generate and maintain an essentially constant density dust cloud within said chamber.

14. The apparatus of claim 13 including a plurality of said beater elements coupled to said shaft and rotatable therewith.

15. Test apparatus for testing the effectiveness of dynamic seals having at least one dynamic dust-exclusion seal operating in a dust-laden environment, said test apparatus comprising:

a housing including support wall having axially opposite sides and an opening extending axially through said wall between said sides;

a shaft supported for rotation within said opening defining an annular gap therebetween;

seal mounting structure associated with said support wall operative to mount a test shaft seal and support the at least one dust-excluding seal in dynamic sealing relation with an associated sealing surface for closing said annular gap; and a dust chamber provided on one side of said wall for exposing an atmospheric side of the test seal to a dust-laden operating environment, said dust chamber including a dust redistribution device rotatably driven at relatively low speed within said chamber and operative to collect and transport dust settled at a bottom region to a top region of said chamber whereupon such dust is released and falls through said chamber under the force of gravity back toward said bottom region, and a dust agitation device spaced radially inwardly of said dust redistribution device and rotatably driven within said chamber at a relatively greater speed than that of said dust redistribution device and operative to disperse the dust released from said dust redistribution device to generate and maintain an essentially constant density dust cloud environment within said chamber.

16. The apparatus of claim 15 including a dry dust collection chamber provided on the other side of said wall in communication with said dust chamber through said annular gap.

17. The apparatus of claim 16 including a pumping seal separate and distinct from the test seal mounted on said wall on said dust collection side of said wall adjacent an oil side of the test seal having at least one shaft-engaging sealing lip supported in sealing relation about said shaft and formed with hydrodynamic features cooperative with said rotatable shaft to pump air from one side of said pumping seal to the other in such manner as to establish a low pressure region on the oil side of the test seal operative to create and maintain a positive draw of the dust-laden air in said dust chamber toward the test seal for movement through said annular gap and into said low pressure region.

18. The apparatus of claim 15 wherein said dust redistribution device is driven at about 1–50 rpm and said dust agitation device is driven at about 1,000 to 3,000 rpm.

19. A method of testing and evaluating the sealing effectiveness of dynamic seals of the type having at least one dust-excluding seal operating in a dust-laden environment, said method comprising:

mounting a dynamic seal to be tested on a stationary support wall about a rotatable shaft extending through an opening in the wall so as to seal an annular gap between the shaft and a wall of the opening;

rotating the shaft, maintaining a dust-laden environment on an atmosphere side of the test seal;

maintaining a dry environment on an opposite oil side of the test seal in communication with the dust-laden environment through the annular gap and sealed therefrom by the test seal; and collecting any dust passing through the gap from the dust-laden environment to the dry environment past the test seal.

20. The method of claim 19 including measuring the collected dust.

21. The method of claim 19 including providing a dust chamber on the atmosphere side of the test seal in which the dust-laden environment is maintained having a dust redistribution device rotatably driven at relatively low speed within the dust chamber and operating to collect and transport dust settled at a bottom region to a top region of the dust chamber whereupon such dust is released and falls through the dust chamber under the force of gravity back toward the bottom region, and a dust agitation device spaced radially inwardly of the dust redistribution device and rotatably driven within the dust chamber at a relatively greater speed than that of the dust redistribution device and operating to disperse the dust released from the dust redistribution device thereby generating and maintaining an essentially constant density dust cloud environment within the dust chamber.

22. The method of claim 19 including providing a dust collection chamber on the oil side of the test seal in which the dry environment is maintained and creating an maintaining a positive draw of the dust-laden air from the dust chamber toward the dust collection chamber.

23. The method of claim 22 including providing a pumping seal separate and distinct from the test seal having at least one radial sealing lip engaging the shaft adjacent the oil side of the test seal and formed with hydrodynamic features cooperating with the rotating shaft to pump air from a region between the pumping seal and the test seal away from the test seal so as to generate a low pressure environment within the region operating to generate and maintain the positive draw of the dust-laden air.

24. The method of claim 23 including collecting at least some dust within the low pressure region.

25. The method of claim 23 wherein the test seal comprises an oil shaft seal including a radial oil lip provided in normal operation to sealingly engage a rotating shaft to retain oil on the oil side of the seal, and including trimming and removing such oil lip prior to testing to prevent sealing engagement of such oil lip with the test shaft.

* * * * *

UNITED STATES PATENT AND TRADEMARK OFFICE
CERTIFICATE OF CORRECTION

PATENT NO. : 6,276,194 B1 Page 1 of 1
APPLICATION NO. : 09/323584
DATED : August 21, 2001
INVENTOR(S) : Mark David Vinton et al.

It is certified that error appears in the above-identified patent and that said Letters Patent is hereby corrected as shown below:

Column 1, line 36, change "industry" to -- in a dusty --.

Column 6, line 14, change "1/8" to -- 1/8" --, line 55, change "speeds" to -- speed --.

Column 7, line 51, after "by", insert -- a valve --.

Column 9, lines 1, 2 and 19, change "hydrodynamic" to -- fluid-dynamic --, line 15, after "ring", insert -- 174 --.

Column 10, lines 8 and 11, change "182" to -- 184 --.

Column 11, line 35, change "hydrodynamic" to -- fluid-dynamic --.

Column 14, line 9, change "hydrodynamic" to -- fluid-dynamic --.

Signed and Sealed this

Twelfth Day of September, 2006

JON W. DUDAS
*Director of the United States Patent and Trademark Office*